US010903638B2

(12) United States Patent
Bergsma

(10) Patent No.: US 10,903,638 B2
(45) Date of Patent: Jan. 26, 2021

(54) CABLE JOINT AND METHOD FOR MUTUALLY CONNECTING A FIRST CABLE END AND A SECOND CABLE END

(71) Applicant: LEIA B.V., Terborg (NL)

(72) Inventor: Dennis Jurjen Bergsma, Varsseveld (NL)

(73) Assignee: LEIA B.V., Terborg (NL)

( * ) Notice: Subject to any disclaimer, the term of this patent is extended or adjusted under 35 U.S.C. 154(b) by 0 days.

(21) Appl. No.: 16/769,178

(22) PCT Filed: Dec. 7, 2018

(86) PCT No.: PCT/NL2018/050821
§ 371 (c)(1),
(2) Date: Jun. 2, 2020

(87) PCT Pub. No.: WO2019/112433
PCT Pub. Date: Jun. 13, 2019

(65) Prior Publication Data
US 2020/0343712 A1 Oct. 29, 2020

(30) Foreign Application Priority Data

Dec. 7, 2017 (NL) ...................................... 2020036

(51) Int. Cl.
*H02G 15/02* (2006.01)
*H02G 15/113* (2006.01)
(Continued)

(52) U.S. Cl.
CPC ....... *H02G 15/113* (2013.01); *H01B 13/0036* (2013.01); *H02G 15/013* (2013.01)

(58) Field of Classification Search
CPC .......... H01B 9/04; H01B 9/06; H02G 15/113; H01R 43/00
(Continued)

(56) References Cited

U.S. PATENT DOCUMENTS 4,875,952 A * 10/1989 Mullin ................. H02G 15/003
156/48
5,251,373 A * 10/1993 DeCarlo .................. H02G 1/14
156/48
(Continued)

FOREIGN PATENT DOCUMENTS

| EP | 2045504 | 4/2009 |
| FR | 2758400 | 7/1998 |
| WO | WO-2014006647 | 1/2014 |

*Primary Examiner* — William H. Mayo, III
(74) *Attorney, Agent, or Firm* — Marcus C. Dawes

(57) ABSTRACT

The invention relates to a cable joint for mutually connecting a first cable end and a second cable end, comprising: a main body with a first cable opening defined by a first opening edge and a second cable opening defined by a second opening edge, via which first cable opening the first cable end can extend into the main body in use and via which second cable opening the second cable end can extend into the main body in use; and—first sealing means for providing a seal between a peripheral surface of the first cable end and the first opening edge and second sealing means for providing a seal between a peripheral surface of the second cable end and the second opening edge. The invention also relates to a method for mutually connecting a first cable end and a second cable end using such a cable joint.

15 Claims, 4 Drawing Sheets

(51) Int. Cl.
*H01B 13/00* (2006.01)
*H02G 15/013* (2006.01)

(58) Field of Classification Search
USPC .... 174/74 R, 77 R, 84 R, 88 R, 92, 93, 155, 174/156
See application file for complete search history.

(56) References Cited

U.S. PATENT DOCUMENTS

| | | | | |
|---|---|---|---|---|
| 5,313,018 | A * | 5/1994 | Meltsch | G02B 6/4447 174/92 |
| 5,610,370 | A * | 3/1997 | Fremgen | G02B 6/445 174/91 |
| 5,734,945 | A * | 3/1998 | Earle | G03D 5/04 118/313 |
| 6,037,544 | A * | 3/2000 | Lee | H02G 15/013 174/92 |
| 6,730,849 | B2 * | 5/2004 | Koessler | H02G 15/013 174/650 |
| 7,723,611 | B2 * | 5/2010 | Stagi | H02G 15/10 174/15.1 |
| 2002/0079697 | A1 * | 6/2002 | Griffioen | F16L 41/023 285/123.1 |
| 2002/0191941 | A1 | 12/2002 | Milanowski | |

\* cited by examiner

CABLE JOINT AND METHOD FOR MUTUALLY CONNECTING A FIRST CABLE END AND A SECOND CABLE END

The invention relates to a cable joint for mutually connecting a first cable end and a second cable end. The cable joint can be used particularly for connecting electricity cables, more particularly for instance medium voltage cables.

Such a cable joint is per se known. The invention can have for its object to improve the existing cable joints.

The cable joint of the type stated in the preamble comprises for this purpose according to the invention:

a main body with a first cable opening defined by a first opening edge and a second cable opening defined by a second opening edge, via which first cable opening the first cable end can extend into the main body in use and via which second cable opening the second cable end can extend into the main body in use; and first sealing means for providing a seal between a peripheral surface of the first cable end and the first opening edge and second sealing means for providing a seal between a peripheral surface of the second cable end and the second opening edge.

The first and second sealing means can provide the advantage of providing a sufficiently good and/or moisture-tight and/or water-tight and/or airtight seal between a peripheral surface of the cable ends and the main body of the cable joint. No or less moisture and/or dirt is hereby able to enter the cable joint via the cable openings, whereby the cable joint and/or the connection of the cable ends will break less easily.

The term cable end can be understood to mean a longitudinal part of a cable which is disposed at a free end of the cable. The cable end can particularly comprise the free end surface of a cable and a part of the length of the cable connecting thereto. The cable end can particularly be defined as the part of the cable which, in a situation in which it is connected by a cable joint, extends in the joint. The cable end can form part of a much longer cable, for instance a cable with a length of several metres, tens of metres or even kilometres. The length dimension of the cable end can be chosen as desired and/or depend on the interior length of the joint which is used. As an indication, although not limitatively, the cable end can have a length dimension of several centimetres to several tens of centimetres.

The cable ends can be or become connected to each other in the main body with per se known means such as for instance, although not exclusively, a cable connector, for instance a terminal block. The main body can for this purpose define a connecting space in which the cable ends are mutually connected in use, this connecting space being accessible from outside the cable joint via the cable openings. The cable ends can extend through the respective cable openings and in the main body, and thus in the connecting space (if provided), while the rest of a cable protrudes from the cable joint.

The main body is in particular substantially hollow or comprises a cavity for accommodating the cable ends therein.

The seal between the peripheral surface of at least one of the cable openings and the respective cable end is optionally moisture-tight and/or water-tight and/or airtight.

The seal can in particular withstand an underpressure of at least 2 bar in the cable joint. The cable joint particularly complies with NEN HD 629 and/or IEC 60502 and/or IEEE 404.

The main body is particularly provided with at least one, preferably non-electrically conductive, spacer for holding the cable end or the cable ends at a distance from an inner surface of the main body. This can provide the advantage that a conductive surface of the cable ends is not in electricity-conducting contact with an inner side of the main body.

The main body can further be provided with separating means for separating the connecting space into a first space, in which a main core of the one cable end can be connected to a main core of the other cable end, and a second space in which an earthing of the one cable end can be connected to an earthing of the other cable end. The separating means can optionally comprise a separating wall. Optionally provided in the first and/or second space is at least one above described spacer for the main core or earthing to be connected in this space.

The main body is optionally substantially elongate and/or substantially cylindrical.

The cable openings are optionally placed longitudinally on either side of the main body, for instance at longitudinal end zones of the main body, preferably opposite each other and/or in register with each other.

At least a part of the inner surface or the whole inner surface of the main body is optionally provided with an electrically conductive layer, for instance a copper coating, in order to provide a Faraday cage.

The cable joint can optionally be filled with an insulating material, for instance an oil, more particularly for instance a silicone oil. The insulating material can be a curing insulating material. The main body can for this purpose be provided with at least one, preferably two, closable filling openings through which the main body can be filled with the insulating material in an, at least during filling, liquid state. Air which may be present in the main body can leave the main body via the at least one filling opening during filling of the main body. The at least one closable filling opening is optionally closable by a respective screw top. The main body is preferably provided on either side thereof with two closable filling openings, wherein in a practical sense the insulating material is supplied via one of the two filling openings and air which is present can leave the main body via the other filling opening.

The cable joint is particularly suitable for $U_{max}$ 12 kV cables and/or for 24 kV cables and/or for $U_{max}$ 36 kV cables.

The cable joint can be suitable for cables with a conductor surface area dimension of 95 mm$^2$ and/or of 300 mm$^2$, and/or for cables with any other conductor surface area dimension lying therebetween, such as for instance 120 mm$^2$, 150 mm$^2$, 185 mm$^2$ and 240 mm$^2$.

In another embodiment the cable joint is suitable for cables with a conductor surface area dimension of 400 mm$^2$ and/or of 800 mm$^2$, and/or for cables with any conductor surface area dimension lying therebetween, such as 500 mm$^2$ and 630 mm$^2$. The cable joint according to this or another embodiment can optionally be suitable for a cable with a conductor surface area dimension of 1000 mm$^2$.

In yet another embodiment the cable joint can be suitable for cables with conductor surface area dimensions of 16 mm$^2$, 25 mm$^2$, 35 mm$^2$, 50 mm$^2$ and 70 mm$^2$.

An alternative way of describing this is that the cable joint according to different embodiments of the invention can be suitable for cables with a conductor surface area dimension of 95 mm$^2$-300 mm$^2$, of 400 mm$^2$-800 mm$^2$, of 400 mm$^2$-1000 mm$^2$, or of 16 mm$^2$-70 mm$^2$.

Although the upper limit and the lower limit of the conductor surface area dimension of the cables for which a stated cable joint is suitable preferably do not lie too far apart as in the above stated embodiments, this to be able to provide a good seal for both the upper limit dimension and the lower limit dimension, the skilled person will appreciate that the invention can also extend to embodiments which are suitable for cables with any of the above or all of the above stated conductor surface area dimensions and conductor surface area dimensions lying therebetween, in any suitable combination.

In an embodiment of the cable joint according to the invention the first and/or second sealing means can be adjusted to at least two different cable cross-sections.

Because the sealing means can be adjusted to at least two different cable cross-sections, no separate and/or additional part is necessary for connecting cables with different cross-sections and/or joints of different dimensions are not necessary. Installation of the cable joint can hereby be easier and/or cheaper. Alternatively or additionally, a cable repair technician may hereby need fewer different, and thereby fewer, parts in stock. Adjustable sealing means are particularly advantageous when the cable joint is applied for mutually connecting cables in a power grid comprising cables with different cable cross-sections, such as the Dutch power grid.

Different cable cross-sections can be understood to mean a difference in cross-sectional dimension and/or cross-sectional form.

The sealing means are preferably adjustable to any cable cross-section dimension between a minimum cable cross-section dimension and a maximum cable cross-section dimension, for instance between 28 and 38 mm and/or to cables with a conductor surface area dimension as elucidated above. Such sealing means can in particular be continuously adjustable to the cable cross-section dimension.

The sealing means are preferably adjustable to any cable cross-section dimension between a minimum cable cross-section dimension and a maximum cable cross-section dimension, wherein the minimum cable cross-section dimension can be several millimetres to several centimetres, particularly for instance between 5-20 mm, smaller than the maximum cable cross-section dimension. Such sealing means can particularly be continuously adjustable to the cable cross-section dimension.

The cross-sectional form can for instance be round or polygonal.

The cross-section of a cable will generally be substantially circular. In this case the first and/or second sealing means can be adjustable to cables with different diameters.

In another embodiment of the cable joint according to the invention the first sealing means and/or the second sealing means comprise:

a sealing element with a cable throughfeed for feeding through the respective cable end, which cable throughfeed defines an inner surface of the sealing element, and wherein the sealing element comprises an outer surface;

a pressing element which can be connected to the main body and which comprises a first pressing surface and a cable passage, wherein the inner surface of the sealing element is configured to lie against the peripheral surface of the respective cable end and wherein the first pressing surface of the pressing element is configured to come to lie against the outer surface of the sealing element when the pressing element is being connected to the main body in a connecting direction, wherein, in a situation in which it is connected to the main body, the pressing element presses with its first pressing surface the sealing element, via its outer surface, with its inner surface against the peripheral surface of the respective cable end.

The pressing element, which can press the sealing element against the peripheral surface, can provide the advantage of providing a sufficiently good and/or moisture-tight and/or water-tight and/or airtight seal. The pressing of the pressing element against the sealing element can optionally contribute to the adjustment of the sealing means to cables with different cross-sections. By way of example, more and/or less, firmer and/or less firm pressing can partially or wholly determine the degree of adjustment of the sealing means to the cable cross-section.

The connecting direction can be directed in the direction of the connecting space and/or toward the other cable end. In the case that the cable openings are disposed on either side of the main body, the connecting direction for the cable openings can be opposed.

The pressing element can in particular press the sealing element against the peripheral surface, thus deforming and/or compressing the sealing element. The deformation can particularly be inward, more particularly radially inward for cables with a substantially round cross-section.

For the purpose of being deformed or compressed, the sealing element can be manufactured from a relatively soft and/or deformable material, for instance a material with a hardness of less than 45 Shore, preferably less than 40 Shore, more preferably between 25 Shore and 40 Shore.

The cable openings, cable throughfeeds and cable passages can all be openings through which a cable end can be passed. Different names have in this application only been chosen to distinguish between the openings for the cable end in respectively the main body, the sealing element and the pressing element.

In a connected situation at least one cable end particularly protrudes through the respective pressing element, the respective sealing element and the respective cable opening via the respective cable opening, cable throughfeed and cable passage thereof.

In assembled situation of the cable joint it is possible particularly for the pressing element, the respective sealing element and the respective cable opening to be disposed substantially concentrically, optionally at the same or partially the same axial position along a central axis of the respective cable opening and/or the respective cable throughfeed and/or the respective cable passage.

In this text the term assembled situation is understood to mean that the main body, the pressing element and the sealing element are mutually connected.

Still more particularly, the respective opening edge can surround the pressing element and the sealing element at least partially, and the pressing element can optionally surround the sealing element at least partially. In that case the order of elements from inside to outside, as seen in a cross-section, is: cable end, sealing element, pressing element, main body.

The term respective can in this application be understood to mean the part corresponding to and/or co-acting with the present part.

In yet another embodiment of the cable joint according to the invention the pressing element is configured to be displaced over a distance in the connecting direction during connecting, wherein the pressing element is configured to further deform and/or compress the sealing element along with an increasing displacement in the connecting direction.

Due to the further deformation and/or compression along with the increasing displacement, the inner surface of the sealing element will be displaced substantially radially inward increasingly further, until the inner surface lies sealingly against a periphery of the respective cable end. When the pressing element is then displaced still further in the connecting direction, which can for instance occur in the case of relatively thick cables, the sealing element can deform and/or be compressed further in other directions because the inner surface lies against the cable end. Regardless of the cable cross-section dimension, the pressing element can thereby in particular be displaced equally far in the connecting direction between for instance a minimum and a maximum cable cross-section dimension, for instance over a predetermined distance and/or until the pressing element lies against the main body. A user of such a cable joint can therefore always displace the pressing element equally far in the connecting direction during connecting, and therefore need not estimate whether the pressing element has been displaced far enough for a sufficiently good seal.

The pressing element can particularly be displaced over the predetermined distance, or until it lies against the main body, under only a manual force.

In contrast to always displacing the pressing element equally far in the connecting direction it is alternatively possible, owing to the increasing deformation and/or compression along with increasing displacement of the pressing element in the connecting direction, to set the degree of sealing and/or to adjust the sealing element to the cable cross-section. The pressing element can in particular be displaced further in the connecting direction in the case of a smaller cable cross-section dimension than in the case of a larger cable cross-section dimension, whereby the sealing element is further deformed and/or compressed, particularly inward, in the case of a smaller cable cross-section dimension. By displacing the pressing element with a sufficient and/or suitable distance the sealing element can hereby come to lie sealingly against the peripheral surface of the cable regardless of the cable cross-section dimension between for instance a minimum and a maximum cable cross-section dimension. It can be the case here that, as soon as the pressing element cannot be displaced, in particular at least manually, any further in the connecting direction, the sealing element lies sealingly against the peripheral surface of the cable. This embodiment can provide the advantage that the sealing element, and thus the material of which it is made, need be less deformable and/or compressible. A material can thereby optionally be chosen which is cheaper and/or easier to manufacture and/or wears less quickly.

It is noted that the manual force can of course differ per person, but that it will be apparent to the skilled person what it is understood to mean.

In yet another embodiment of the cable joint according to the invention the outer surface of the sealing element is disposed substantially parallel to a central axis of the cable throughfeed, wherein the first pressing surface is disposed obliquely relative to a central axis of the cable passage, wherein the central axes of the cable throughfeed and the cable passage coincide in a connected situation, and wherein the pressing surface is disposed obliquely relative to the central axis of the cable passage such that the distance from the pressing surface to the central axis of the cable passage decreases in a direction opposite to the connecting direction, such that, when the pressing element is being connected to the main body and the pressing element is thereby displaced in the connecting direction relative to the main body, the pressing surface comes to lie with a progressively decreasing inner cross-sectional dimension against the outer surface of the sealing element.

Because the first pressing surface comes to lie with a progressively decreasing inner cross-sectional dimension against the outer surface of the sealing element, the degree of deformation and/or compression of the sealing element increases by displacing the pressing element in the connecting direction. A sufficiently good and/or moisture-tight and/or water-tight and/or airtight seal can hereby be provided. The sealing element can hereby alternatively or additionally be adjusted to cables with different cross-sections in that the pressing element can be displaced in the connecting direction relative to the main body, at least until the cross-sectional dimension of the pressing surface is so small that it presses against the sealing element. The pressing element can then optionally be displaced still further in the connecting direction.

The angle of the first pressing surface relative to the central axis of the cable passage can for instance be greater than 10°. In the case of an angle greater than 10° a good seal can be obtained and/or the degree of deformation and/or compression of the sealing element can be sufficient for adjusting to cables with different cross-sections. The angle can preferably be greater than 15°, more preferably greater than 20°, still more preferably greater than 25°. The angle is for instance smaller than 35°, more preferably smaller than 30°.

It has been found by applicant that a particularly good seal can be obtained when the first pressing surface is disposed at an angle of particularly about 27° relative to the central axis of the cable passage, wherein the first pressing surface becomes increasingly further removed from the central axis in the connecting direction. An outer surface of the sealing element which is disposed substantially parallel to the central axis of the cable throughfeed is here understood to mean at least that the outer surface of the sealing element forms at most a small angle with the central axis of the cable throughfeed, particularly an angle smaller than the angle of the first pressing surface relative to the central axis of the cable passage. Because the angle of the first pressing surface relative to the central axis of the cable passage is greater than the angle of the outer surface of the sealing element with the central axis of the cable throughfeed, the first pressing surface can displace the sealing element radially inward so that a good seal can be obtained and/or the degree of deformation and/or compression of the sealing element can suffice for adjusting to cables with different cross-sections. The angle of the outer surface of the sealing element with the central axis of the cable throughfeed is preferably smaller than 5°, more preferably smaller than 3°, still more preferably smaller than 1°, still more preferably about 0°, wherein 0° provides an outer surface of the sealing element which is purely parallel to the central axis of the cable throughfeed and the other angles an outer surface of the sealing element which is substantially parallel to the central axis of the cable throughfeed.

The central axes of the cable throughfeed, the cable passage and/or the cable opening are in particular parallel to the insertion direction. Still more particularly, the central axes of the cable throughfeed, the cable passage and/or the cable opening lie mutually in line. Still more particularly, the cable throughfeed, the cable passage and/or the cable opening are disposed concentrically in a situation in which the pressing element is connected to the main body.

The first pressing surface particularly tapers in a direction opposite to the connecting direction. Still more particularly, the first pressing surface is substantially frustoconical.

The pressing element can particularly be connected to the main body by means of a screw connection. During connecting, the pressing element can be displaced increasingly further axially, in the connecting direction, by rotating around the connecting direction. In particular, the main body can be provided with an external screw thread and the pressing element with an internal, corresponding screw thread, or vice versa.

In yet another embodiment of the cable joint according to the invention the sealing element can be deformed and/or compressed such that the pressing element can press the sealing element against the peripheral surface of the respective cable end, thus deforming and/or compressing the sealing element. The deformation and/or compression of the sealing element can in particular take place substantially inward, particularly radially inward.

Because the sealing element is deformable and/or compressible, the sealing element can deform and/or be compressed with a pressure force of the pressing element in order to adjust to different cable cross-sections, and thereby provide the desired seal.

The sealing element can in particular be deformable and/or compressible such that the cable throughfeed becomes smaller. In the case that the sealing element comprises a cable throughfeed with a circular cross-section, the sealing element can be deformable and/or compressible such that the diameter of the circular cross-section is reduced. A peripheral edge of the cable throughfeed can for this purpose move radially inward in the case of deformation and/or compression of the sealing element.

The sealing element can particularly be manufactured substantially from a plastic, such as for instance a silicone and/or an Ethylene Propylene Diene Monomer (EPDM).

In yet another embodiment of the cable joint according to the invention:
the first and/or second opening edges taper in their connecting direction;
the respective sealing element comprises a sealing collar configured to lie against the at least one tapering opening edge; and
the pressing element comprises a second pressing surface which tapers in the connecting direction,
wherein, in a situation in which it is connected to the main body, the pressing element presses with its second pressing surface the sealing collar against the respective opening edge.

Because the first and/or second opening edge tapers, at least part of the force of the pressing element acts in a radial direction of the opening edge. The pressing element can hereby be more easily connectable to the main body. The tapering opening edge and the tapering second pressing surface can alternatively or additionally provide the advantage that the sealing element is forced into the desired position when the pressing element is connected to the main body. The tapering surfaces can thereby particularly have a setting and/or directing function. The sealing collar provides a good and/or moisture-tight and/or water-tight and/or airtight seal between the opening edge and the second pressing surface.

It has been found by applicant that a particularly good seal can be obtained when the second pressing surface is disposed at an angle of particularly about 35° relative to the central axis of the cable passage, wherein the second pressing surface becomes increasingly further removed from the central axis in a direction opposite to the connecting direction.

The contact surface of the respective sealing element particularly runs substantially parallel to the first and second opening edge in an or the assembled situation of the cable joint. An alternative way of formulating this is that an angle of the first and/or second opening edge and an angle of the sealing element relative to the respective central axes thereof are substantially equal.

This embodiment is particularly advantageous when the pressing element can be screwed onto the main body, because the tapering form of the first and/or second opening edge allows the pressing element to be screwed easily, optionally manually, onto the main body. A tapering opening edge can alternatively or additionally also provide the advantage that the pressing element is less inclined to twist off after being screwed onto the main body.

Still more particularly, this embodiment can provide the advantage that the sealing element is pressed against the main body at a desired position, such as for instance at a position where a seal between two parts of the main body is provided.

Owing to the tapering surfaces, a great force can alternatively or additionally be applied to the sealing element, whereby a sufficiently good and/or moisture-tight and/or water-tight and/or airtight seal can be provided between the sealing means and the respective opening edge.

The sealing means can in particular provide a seal with both the respective cable end and the respective cable opening.

In yet another embodiment of the cable joint according to the invention the collar extends obliquely outward relative to the outer surface of the sealing element, in a direction opposite to the connecting direction.

Because the collar of the sealing element extends obliquely outward, it is disposed substantially parallel to the tapering opening edge and the second pressing surface. An alternative way of formulating this is that an angle of the extending direction of the collar relative to the central axis of the sealing element is substantially equal to the angle of the first and/or second opening edge and the angle of the sealing element relative to the respective central axes thereof. The collar can hereby provide a good and/or moisture-tight and/or water-tight and/or airtight seal between the opening edge and the second pressing surface.

In yet another embodiment of the cable joint according to the invention the main body comprises at least a first shell and a second shell which can be connected to the first shell, wherein the first shell and the second shell are provided with connecting means co-acting releasably with each other for forming a releasable connection of the first shell and the second shell.

Because the main body consists of the first and the second shell, which are connectable with releasable connecting means, the cable joint can be opened and optionally closed again after installation. It is hereby possible to open the cable joint for inspection, and optionally close it again by connecting the shells to each other. This provides the option of no new cable joint having to be used. If the cable joint is filled with an insulating material or curing insulating material, this can be removed before the cable joint is reused. After reuse, the cable joint can once again be filled with insulating material.

Releasable can at least be understood to mean that the shells do not break when the connection therebetween is released.

The first shell and the second shell in particular each form a different part of a peripheral surface of the main body, and the first shell and the second shell together form a full peripheral surface of the main body.

The mutually co-acting connecting means can in particular comprise engaging surfaces connected to the shells, which engaging surfaces engage on each other in a connected situation and wherein the shells can be mutually connected by bolts and/or nuts and/or screws. The screws can optionally be self-tapping.

The connection between the shells can particularly be moisture-tight and/or water-tight and/or airtight.

Still more particularly, the seal between the shells can withstand an underpressure in the cable joint of a minimum of 2 bar.

At least one, preferably both, of the two shells is or are in particular provided with a groove over an engaging surface thereof, in which groove a deformable sealing member can be arranged for the purpose of providing a seal between the shells. The deformable sealing member is particularly an elongate member with a substantially circular cross-section.

The pressing element can optionally mutually connect the shells or contribute to the mutual connection thereof. This can for instance take place in that the pressing element can be screwed over end zones of the shells as soon as the shell parts have been arranged on each other and optionally connected to each other. This embodiment is particularly advantageous when the first shell and the second shell each define independently of each other a part, particularly a half, of the first and second cable opening.

The pressing element can hereby also be used to provide a seal between the two shells. In the case that the pressing element can be screwed onto the main body, the pressing element can be used to easily provide a sufficiently strong connection between the two shells.

In yet another embodiment of the cable joint according to the invention the outer surface of the sealing element has a substantially cylindrical form. The above described optionally provided sealing collar can, if provided, extend from the cylindrical outer surface of the sealing element, particularly at an end of the sealing element situated closest to the interior of the main body during use of the cable joint. The sealing collar can particularly extend obliquely outward from the cylindrical outer surface of the sealing element, in a direction opposite to the connecting direction.

In yet another embodiment of the cable joint according to the invention a free space can be provided between the sealing collar and the, optionally cylindrical, outer surface of the sealing element. The sealing collar can hereby be displaceable in somewhat flexible manner and/or the pressing element can be arranged at least partially in the free space, such that the pressing element can with its second pressing surface press the sealing collar against a respective opening edge and can with its first pressing surface press the sealing element substantially radially inward against the cable.

In yet another embodiment of the cable joint according to the invention the pressing element has, as seen in longitudinal cross-section, a substantially pointed, optionally rounded end, wherein one side of the pointed end forms the first pressing surface and the other, opposite side of the pointed end forms the second pressing surface. The point extends here in the direction of the connecting direction. The one side is here directed toward the cable and the second side is remote from the cable. Such a pointed form provides the advantage that the pressing element is configured to both press with its first pressing surface against the outer surface of the sealing element and press with its second pressing surface against the sealing collar. Such a pointed end can for instance be arranged in the above stated free space between the sealing collar and the, optionally cylindrical, outer surface of the sealing element.

In yet another embodiment of the cable joint according to the invention the pressing element has on its first pressing surface a protrusion.

In yet another embodiment of the cable joint according to the invention the sealing element has over a first part of the length thereof a first thickness and over a second part of the length a second, smaller thickness.

Because the sealing element has a second part with a smaller thickness, the first part can deform more flexibly, inter alia in the direction of the second part of the length. A good seal and/or an adjustment to different cable diameters can hereby be provided.

The first thickness can in particular be a minimum of 1.5 times greater than the second thickness, more particularly 2 times greater.

The length of the sealing element and/or of the pressing element, and thereby their respective longitudinal directions, are here defined parallel to the central axis of the respective cable throughfeed and/or the respective cable passage.

The thickness of the sealing element is here defined in a substantially radial direction and/or transversely of the longitudinal direction of the sealing element.

The invention also relates to a method for mutually connecting a first cable end and a second cable end, comprising the steps, to be performed in any suitable order, of:

(a) providing a cable joint, comprising:
  a main body with a first cable opening defined by a first opening edge and a second cable opening defined by a second opening edge, via which first cable opening the first cable end can extend into the main body in use and via which second cable opening the second cable end can extend into the main body in use; and
  first sealing means for providing a seal between a peripheral surface of the first cable end and the first opening edge and second sealing means for providing a seal between a peripheral surface of the second cable end and the second opening edge;

(b) feeding through the first cable end and the second cable end into the main body via the respective cable openings, (c) and mutually connecting the first cable end and the second cable end in the main body;

(d) providing a seal between the peripheral surface of the first cable end and the first opening edge using the first sealing means and providing a seal between the peripheral surface of the second cable end and the second opening edge using the second sealing means.

The cable joint can in particular be a cable joint as described in the claims and/or as described above or below in one or more embodiments and/or with one or more of the above stated features, alone or in any suitable combination.

Such a method can have all the above stated advantages and/or variations, alone or in any suitable combination.

The method can in particular further comprise a step for arranging a copper coating on at least a part of an inner surface of the main body.

The method can in particular further comprise a step of filling the main body with an insulating material, for instance an oil, more particularly for instance a silicone oil.

In an embodiment of the method according to the invention the first sealing means and/or the second sealing means comprise:

a sealing element with a cable throughfeed for feeding through the respective cable end, which cable throughfeed defines an inner surface of the sealing element, and wherein the sealing element comprises an outer surface;

a pressing element which can be connected to the main body and which comprises a first pressing surface and a cable passage, wherein the inner surface of the sealing element is configured to lie against the peripheral surface of the respective cable end and wherein the first pressing surface of the pressing element is configured to come to lie against the outer surface of the sealing element when the pressing element is being connected to the main body in a connecting direction, wherein, in a situation in which it is connected to the main body, the pressing element presses with its first pressing surface the sealing element, via its outer surface, with its inner surface against the peripheral surface of the respective cable end, wherein step (d) comprises of:

connecting the pressing element to the main body, wherein the pressing element is displaced in the connecting direction.

The pressing element can here be configured to be displaced over a distance in the connecting direction during connecting, wherein the pressing element is configured to deform and/or compress the sealing element further inward along with an increasing displacement in the connecting direction.

Step (d) can here be performed, particularly manually, such that the pressing element is displaced in the connecting direction at least so far that the pressing element presses the sealing element sealingly against the peripheral surface of the cable.

After the pressing element presses the sealing element sealingly against the peripheral surface of the cable, the pressing element can in step (d) preferably be displaced further in the connecting direction until the pressing element has been displaced over a predetermined distance and/or until the pressing element lies against the main body, whereby the pressing element cannot be displaced any further in the connecting direction.

In this preferred embodiment the pressing element can thus always be displaced equally far in the connecting direction, irrespective of the cable cross-section dimension of the respective cable end. A user of such a cable joint can always displace the pressing element equally far in the connecting direction during connecting, and therefore need not estimate whether the pressing element has been displaced far enough for a sufficiently good seal.

In another embodiment the pressing element can be displaced further or less far in the connecting direction, depending on the cable cross-section dimension of the respective cable end, until the pressing element presses the sealing element sealingly against the peripheral surface of the cable and/or until further displacement under manual force becomes impossible.

In an embodiment of the method according to the invention, wherein:

the main body which is provided in step (a) comprises at least a first shell and a second shell which can be connected to the first shell, wherein the first shell and the second shell are provided with connecting means co-acting releasably with each other for forming a releasable connection of the first shell and the second shell, step (b) is performed by a first step (b1) of feeding the cable ends through a part of the opening edge which is formed by the first shell, and a second step (b2) of arranging the second shell on the first shell, such that the cable ends have been fed through another part of the opening edge which is formed by the second shell, wherein step (b1) is performed at least before step (c) and step (b2) is performed at least after step (c), and comprising step (e) of mutually connecting the first shell and the second shell using the mutually co-acting connecting means.

The advantage of this embodiment is that the cable ends are accessible for connection as long as the first shell and the second shell are separated from each other.

The invention will be further elucidated with reference to figures, wherein.

Corresponding elements are designated in the figures with corresponding reference numerals.

Figure 1:
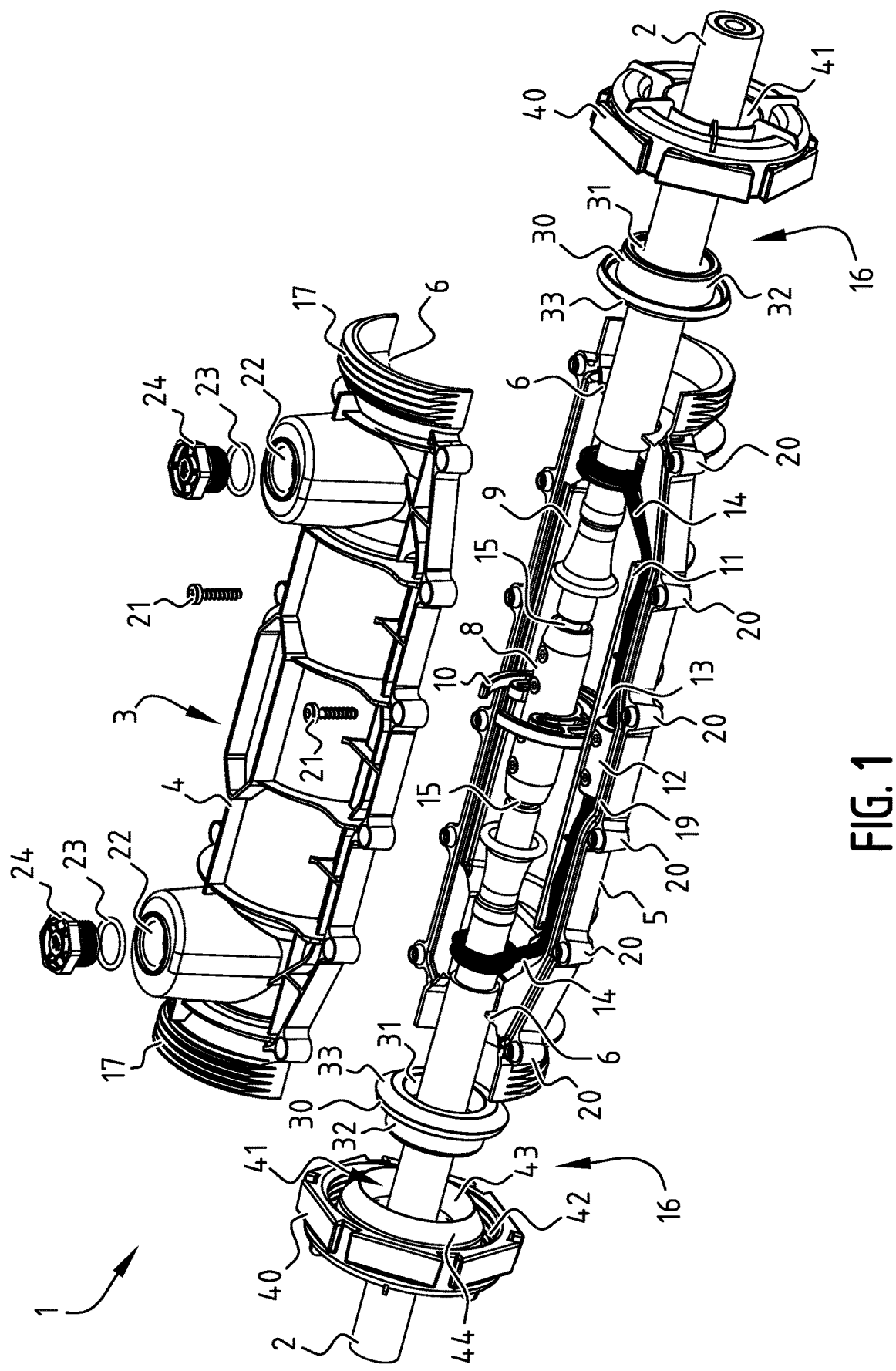
FIG. 1 shows schematically a perspective at least partially cut-away view of an embodiment of the cable joint according to the invention.
Figure 2:
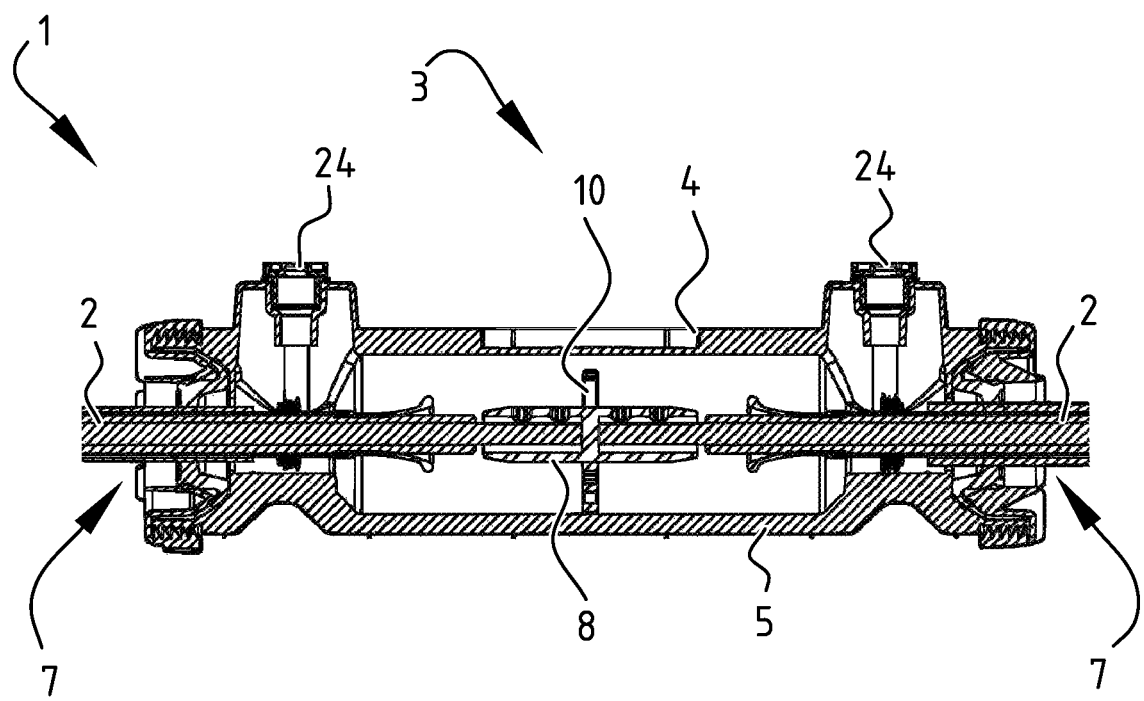
FIG. 2 shows schematically a longitudinal section of the cable joint of FIG. 1.
Figure 3:
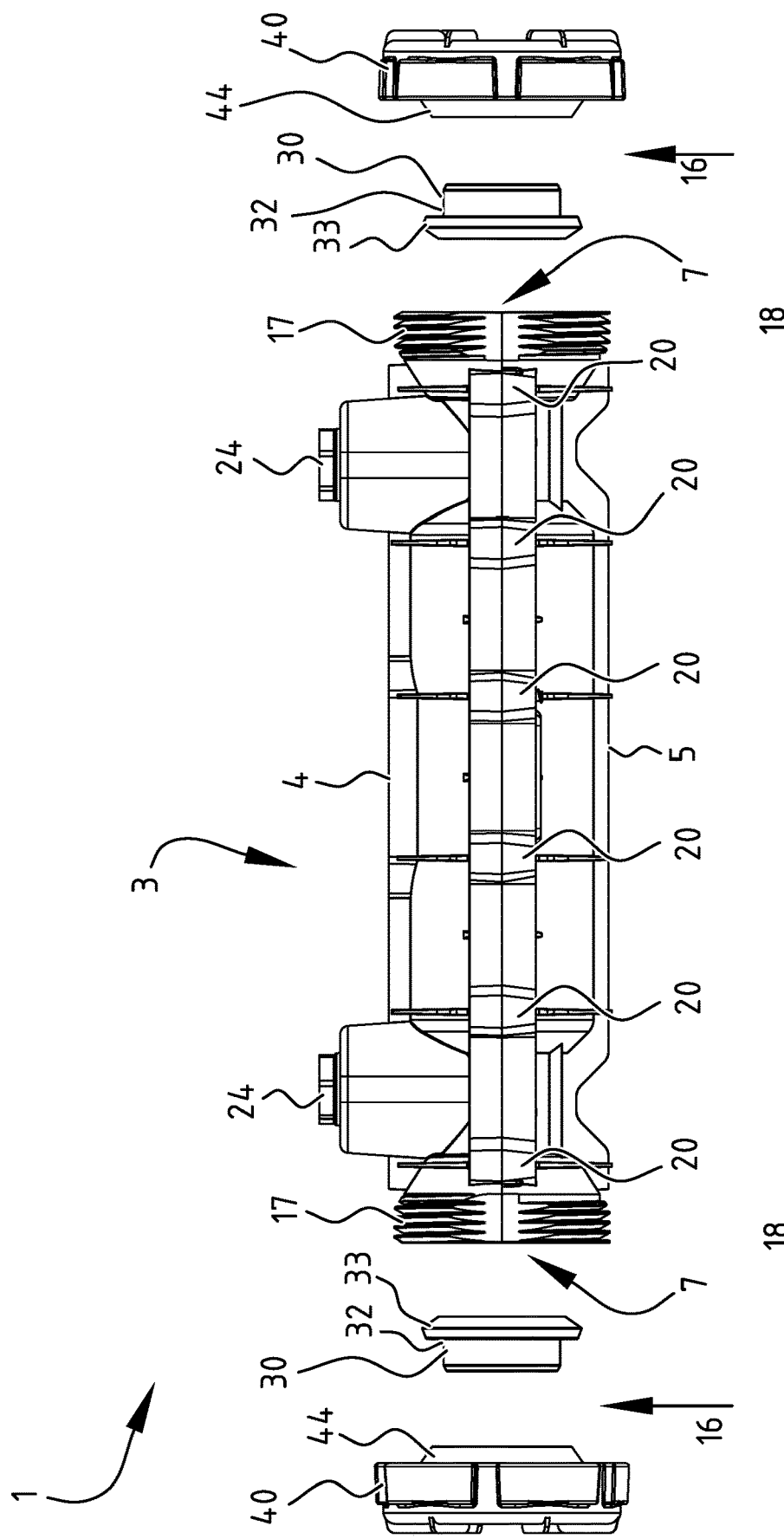
FIG. 3 shows schematically an at least partially cut-away side view of the cable joint of FIGS. 1 and 2.

FIGS. 1-4 show a cable joint 1 for mutually connecting two cable ends 2, see particularly FIGS. 1 and 2. Cable joint 1 comprises a main body 3, consisting in this example of a first shell 4 and a second shell 5. Main body 3 comprises, as seen in the longitudinal direction, on either side an opening edge 6, this defining a cable opening 7. FIGS. 1 and 2 show how the two cable ends 2 extend through cable openings 7 into main body 3. A remaining part of the cables protrudes from main body 3 via cable openings 7. Only a small part of the cables is here depicted outside the main body 3; it is self-evident that the cables can run on much longer.

In this case the main cores 15 of cable ends 2 are mutually connected by a first cable connector 8 in a first connecting chamber 9. The two cable ends are held centred in first connecting chamber 9, and thus at a distance from an inner peripheral surface of main body 3, by holders 10. The first connecting chamber 9 is separated from a second connecting chamber 13 by separating means 11, these comprising in this example a longitudinal separating wall 11. Farthings 14 of the cable ends are mutually connected in second connecting chamber 13 by means of an earthing connector 12.

Cable joint 1 is provided with sealing means 16, which in this case comprise in each case a sealing element 30 and a pressing element 40. Sealing element 30 and pressing element 40 are discussed hereinbelow in the singular per cable opening 7, but each sealing element 30 and/or each pressing element 40 can have the features discussed below. Sealing element 30 has a cable throughfeed 31 through which cable ends 2 can be placed. Cable throughfeed 31 defines an inner surface of sealing element 30 which can lie against a peripheral surface of cable ends 2.

Pressing element 40 has a cable passage 41 and can be connected via screw thread 42 to a screw thread 17 of main body 3. When pressing element 40 is connected to main body 3 by screwing, pressing element 40 displaces toward main body 3 in a connecting direction 18. Pressing element 40 further has a first pressing surface 43 which comes to lie against an outer surface 32 of sealing element 30 when pressing element 40 is connected to main body 3 with sealing element 30 therebetween. Because pressing element 40 lies against the outer surface 32 of sealing element 30 in the situation in which it is connected to main body 3, pressing element 40 presses the inner surface of sealing element 30 against a peripheral surface of cable ends 2.

Figure 4:
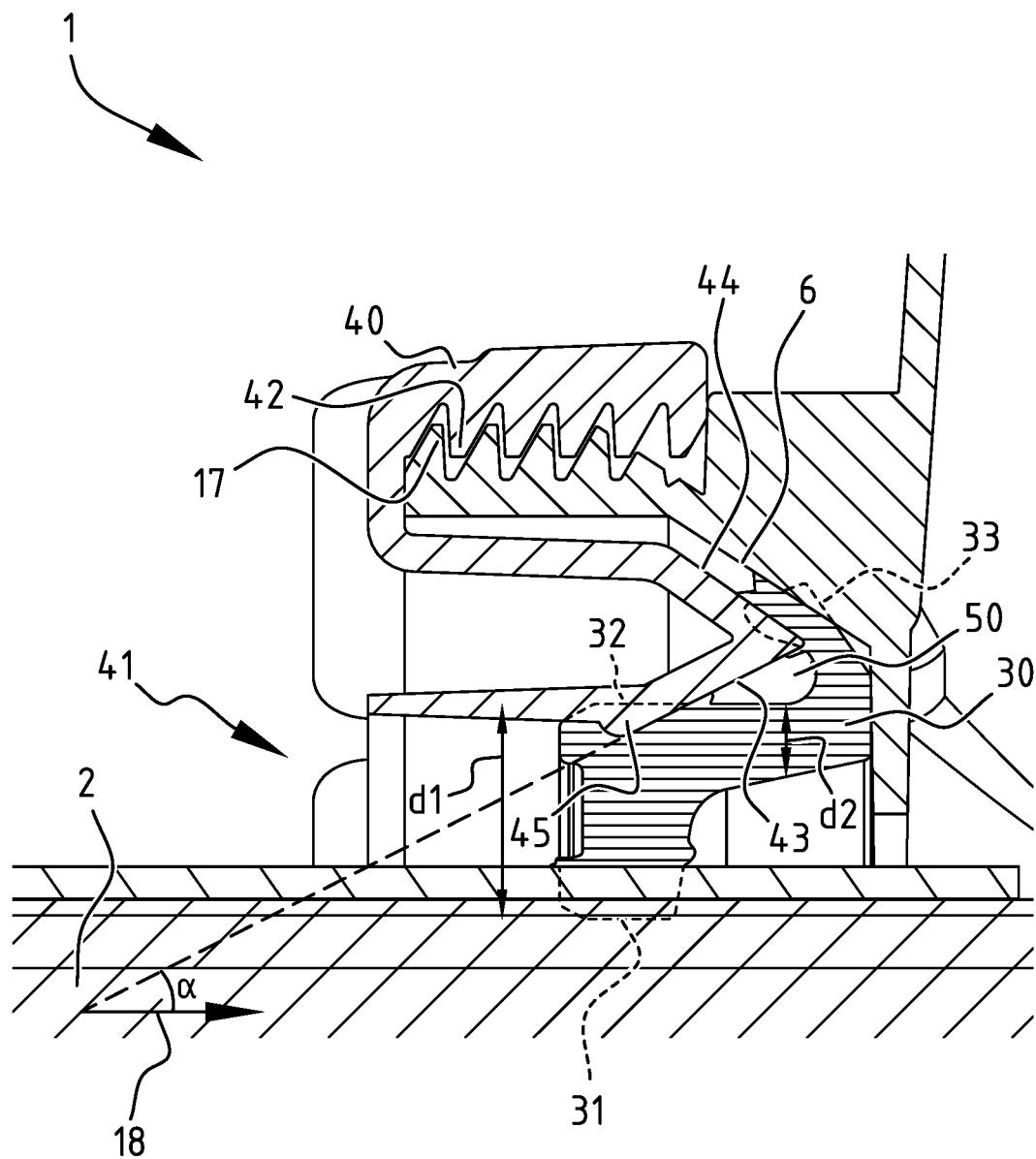
FIG. 4 shows schematically an enlarged view of a part of the section of FIG. 2.

In this case a longitudinal direction of outer surface 32 of sealing element 30 is parallel to a central axis of cable throughfeed 31. The first pressing surface 43 of pressing element 40 tapers at an angle α of 27° relative to a central axis of cable passage 41 in a direction opposite to the connecting direction 18. This angle α is shown in FIG. 4, only shown relative to the connecting direction 18, which is parallel to the central axis of cable passage 41. In other words, in a situation in which pressing element 40 is connected to main body 3, the cross-section of cable passage 41 becomes smaller as the distance to main body 3 increases. Pressing element 40 hereby lies with an increasingly smaller cross-section of cable passage 41 against the outer surface 32 of sealing element 30 as pressing element 40 is displaced further in the connecting direction 18. The cross-section of cable throughfeed 31 of sealing element 30 thereby becomes increasingly smaller, thus deforming and/or compressing sealing element 30, and can in particular become smaller when a cable cross-section of cable end 2 is smaller. Sealing element 30 can deform and/or be compressed to such an extent that the inner surface of sealing element 30 is pressed sealingly against the peripheral surface of cable end 2. In the case of a smaller cable cross-section, sealing element 30 can thus be deformed and/or compressed further.

In this example the opening edges 6 taper at least partially in the connecting direction 18. A diameter of cable openings 7 thereby becomes increasingly smaller in connecting direction 18. Sealing elements 30 have a collar 33 which can lie against the tapering opening edges 6. Pressing elements 40 further also have a second pressing surface 44 tapering at an angle of 35° relative to the central axis of cable passage 41 in connecting direction 18. In a situation in which it is connected to main body 3, pressing surface 44 in this case runs parallel to the respective opening edge 6. When pressing element 40 is connected to main body 3 (as in FIG. 2), pressing element 40 presses with its second pressing surface 44 collar 33 of sealing element 30 against opening edge 6 of main body 3. In this embodiment collars 33 of sealing elements 30 extend obliquely outward from and relative to the outer surface 32 of sealing element 30 in a direction opposite to the connecting direction 18.

One shell 5 is provided with a groove 19 over an engaging surface 20 thereof, in which groove a deformable sealing member can be placed at least partially for the purpose of mutually connecting shells 4, 5. The two shells 4, 5 are provided with mutually co-acting connecting means, which in this example are also formed by the engaging surfaces 20. Using for instance self-tapping screws 21 the shells can be connected to each other. For the sake of simplicity not all self-tapping screws 21 have been drawn. If desired, the self-tapping screws 21 can be removed after installation, whereby shells 4, 5 can be removed from each other. After this, the same shells 4, 5 can optionally be connected once again with self-tapping screws 21.

In this example the pressing element 40 forms part of the mutually co-acting connecting means of the two shells 4, 5. Pressing element 40 contributes in particular to the mutual connecting of shells 4, 5 in that pressing element 40 is screwed around end zones of the two shells 4, 5 in a situation in which it is connected to main body 3.

In this specific example main body 3 also comprises two filling openings 22, via which the main body 3 can be filled with for instance silicone oil. Liquid openings 22 can be closed, then opened again and closed again, in that an O-ring 23 and screw top 24 are provided.

An undeformed form of sealing element 30 is shown with broken lines in FIG. 4. Full lines show how sealing element 30 has been deformed under the influence of a pressing element 40. Shown in particular is how collar 33 of sealing element 30 has been pressed against opening edge 6 of main body 3, and how outer surface 32 has been pressed inward by pressing element 40. Inner surface 31 of sealing element 30 thereby lies against cable end 2. Because pressing element 40 has been displaced even further in connecting direction 18 and inner surface 31 cannot move further radially inward because it lies against cable end 2, sealing element 30 has been further deformed in other directions (see full lines). If sealing element 30 were not deformed in said other directions, it would take on roughly the shape designated with broken lines, i.e. the inner surface 31 would have been displaced further radially inward.

FIG. 4 further shows that, as seen in longitudinal cross-section, pressing element 40 has in this embodiment a substantially, in this case slightly rounded, pointed end, wherein the point extends in the direction of connecting direction 18, wherein one side of the pointed end forms the first pressing surface 43 and the other, opposite side of the pointed end forms the second pressing surface 44. The one side is here directed toward cable 2, and the second side is remote from cable 2.

FIG. 4 further shows that the outer surface 32 of sealing element 30 has a substantially cylindrical form in this embodiment. Collar 33 extends obliquely outward from the cylindrical outer surface 32 of sealing element 30 in a direction opposite to the connecting direction 18. A free space 50 is hereby provided between collar 33 and the cylindrical outer surface 32 of sealing element 30. In this embodiment collar 33 is disposed at an end of sealing element 30, that is at the end of sealing element 30 situated closest to the interior of the main body during use of cable joint 1.

As is further apparent from FIG. 4, in this embodiment the pointed end of pressing element 40 extends in free space 50 so that the pressing element presses both with its first pressing surface 43 against the outer surface 32 of sealing element 30 and with its second pressing surface 44 against collar 33.

FIG. 4 further shows that in this embodiment pressing element 40 has a protrusion 45 on its first pressing surface 43. Protrusion 45 extends radially inward, i.e. in the direction of cable 2.

FIG. 4 further shows that in this embodiment sealing element 30 has over a first part of the length thereof a first thickness d1 and over a second part of the length a second, smaller thickness d2. The first thickness d1 is in this example about 2 times as thick as the second thickness d2.

It is noted that the invention is not limited to the shown embodiments, but also extends to variants within the scope of the appended claims.

The invention claimed is:

1. Cable joint for mutually connecting a first cable end and a second cable end, comprising:
   a main body with a first cable opening defined by a first opening edge and a second cable opening defined by a second opening edge, via which first cable opening the first cable end can extend into the main body in use and via which second cable opening the second cable end can extend into the main body in use; and
   first sealing means for providing a seal between a peripheral surface of the first cable end and the first opening edge and second sealing means for providing a seal between a peripheral surface of the second cable end and the second opening edge, wherein the first sealing means and/or the second sealing means comprises:
- a sealing element with a cable throughfeed for feeding through the respective cable end, which cable throughfeed defines an inner surface of the sealing element, and wherein the sealing element comprises an outer surface; and
- a pressing element which can be connected to the main body and which comprises a first pressing surface and a cable passage,
- wherein the inner surface of the sealing element is configured to lie against the peripheral surface of the respective cable end and wherein the first pressing surface of the pressing element is configured to come to lie against the outer surface of the sealing element when the pressing element is being connected to the main body in a connecting direction, wherein, in a situation in which it is connected to the main body, the pressing element presses with its first pressing surface the sealing element, via its outer surface, with its inner surface against the peripheral surface of the respective cable end, and
- wherein the outer surface of the sealing element is disposed substantially parallel to a central axis of the cable throughfeed, and wherein the pressing surface is disposed obliquely relative to a central axis of the cable passage, wherein the central axes coincide in a connected situation, and wherein the pressing surface is disposed obliquely relative to the central axis of the cable passage such that the distance from the pressing surface to the central axis of the cable passage decreases in a direction opposite to the connecting direction, such that, when the pressing element is being connected to the main body and the pressing element is thereby displaced in the connecting direction relative to the main body, the pressing surface comes to lie with a progressively decreasing inner cross-sectional dimension against the outer surface of the sealing element.

2. Cable joint according to claim 1, wherein the first and/or second sealing means are adjustable to at least two different cable cross-sections.

3. Cable joint according to claim 1, wherein the pressing element is configured to be displaced over a distance in the connecting direction during connecting, wherein the pressing element is configured to deform and/or compress the sealing element further inward along with an increasing displacement in the connecting direction.

4. Cable joint according to claim 1, wherein the sealing element, can be deformed such that the pressing element can press the sealing element against the peripheral surface of the respective cable end, thus deforming and/or compressing the sealing element.

5. Cable joint according to claim 1, wherein the pressing element has, as seen in longitudinal cross-section, a substantially pointed, optionally rounded end, wherein one side of the pointed end forms the first pressing surface and the other, opposite side of the pointed end forms the second pressing surface.

6. Cable joint according to claim 1, wherein:
- the first and/or second opening edges taper in their connecting direction;
- the respective sealing element comprises a sealing collar configured to lie against the at least one tapering opening edge; and
- the pressing element comprises a second pressing surface which tapers in the connecting direction,
- wherein, in a situation in which it is connected to the main body, the pressing element presses with its second pressing surface the sealing collar against the respective opening edge.

7. Cable joint according to claim 6, wherein the collar extends obliquely outward relative to the outer surface of the sealing element, in a direction opposite to the connecting direction.

8. Cable joint according to claim 6, wherein the pointed end of the pressing element extends in use in a free space between the sealing collar and the outer surface of the sealing element.

9. Cable joint according to claim 6, wherein a free space is provided between the sealing collar and the outer surface of the sealing element.

10. Cable joint according to claim 6, wherein the pressing element has, as seen in a longitudinal cross-section, a substantially pointed, optionally rounded end, wherein one side of the pointed end forms the first pressing surface and the other, opposite side of the pointed end forms the second pressing surface, the point extending in the direction of the connecting direction, the one side being directed toward the cable and the second side being remote from the cable.

11. Cable joint according to claim 1, wherein the main body comprises at least a first shell and a second shell which can be connected to the first shell, wherein the first shell and the second shell are provided with connecting means co-acting releasably with each other for forming a releasable connection of the first shell and the second shell.

12. Cable joint according to claim 1, wherein the sealing element has over a first part of the length thereof a first thickness and over a second part of the length a second, smaller thickness.

13. Method for mutually connecting a first cable end and a second cable end, comprising the steps, to be performed in any suitable order, of:
(a) providing a cable joint, comprising:
  - a main body with a first cable opening defined by a first opening edge and a second cable opening defined by a second opening edge, via which first cable opening the first cable end can extend into the main body in use and via which second cable opening the second cable end can extend into the main body in use; and
  - first sealing means for providing a seal between a peripheral surface of the first cable end and the first opening edge and second sealing means for providing a seal between a peripheral surface of the second cable end and the second opening edge;
(b) feeding through the first cable end and the second cable end into the main body via the respective cable openings,
(c) and mutually connecting the first cable end and the second cable end in the main body;
(d) providing a seal between the peripheral surface of the first cable end and the first opening edge using the first sealing means and providing a seal between the peripheral surface of the second cable end and the second opening edge using the second sealing means,
wherein the first sealing means and/or the second sealing means comprise:
  - a sealing element with a cable throughfeed for feeding through the respective cable end, which cable throughfeed defines an inner surface of the sealing element, and wherein the sealing element comprises an outer surface; and a pressing element which can be connected to the main body and which comprises a first pressing surface and a cable passage, wherein the inner surface of the sealing element is configured to lie against the peripheral surface of the respective cable end and wherein the first pressing surface of the pressing element is configured to come to lie against the outer surface of the sealing element when the pressing element is being connected to the main body in a connecting direction, wherein, in a situation in which it is connected to the main body, the pressing element presses with its first pressing surface the sealing element, via its outer surface, with its inner surface against the peripheral surface of the respective cable end, wherein the outer surface of the sealing element is disposed substantially parallel to a central axis of the cable throughfeed, and wherein the pressing surface is disposed obliquely relative to a central axis of the cable passage, wherein the central axes coincide in a connected situation, and wherein the pressing surface is disposed obliquely relative to the central axis of the cable passage such that the distance from the pressing surface to the central axis of the cable passage decreases in a direction opposite to the connecting direction, such that, when the pressing element is being connected to the main body and the pressing element is thereby displaced in the connecting direction relative to the main body, the pressing surface comes to lie with a progressively decreasing inner cross-sectional dimension against the outer surface of the sealing element, wherein step (d) comprises of:
connecting the pressing element to the main body, wherein the pressing element is displaced in the connecting direction.

14. Method according to claim 13, wherein:

the main body which is provided in step (a) comprises at least a first shell and a second shell which can be connected to the first shell, wherein the first shell and the second shell are provided with connecting means co-acting releasably with each other for forming a releasable connection of the first shell and the second shell, wherein step (b) is performed by a first step (b1) of feeding the cable ends through a part of the opening edge which is formed by the first shell, and a second step (b2) of arranging the second shell on the first shell, such that the cable ends have been fed through another part of the opening edge which is formed by the second shell, wherein step (b1) is performed at least before step (c) and step (b2) is performed at least after step (c), and further comprising step (e) of mutually connecting the first shell and the second shell using the mutually co-acting connecting means.

15. Method according to claim 13, wherein the method further comprises a step of:

arranging a copper coating on at least a part of an inner surface of the main body, and/or filling the main body with an insulating material.

* * * * *